Figure 1:
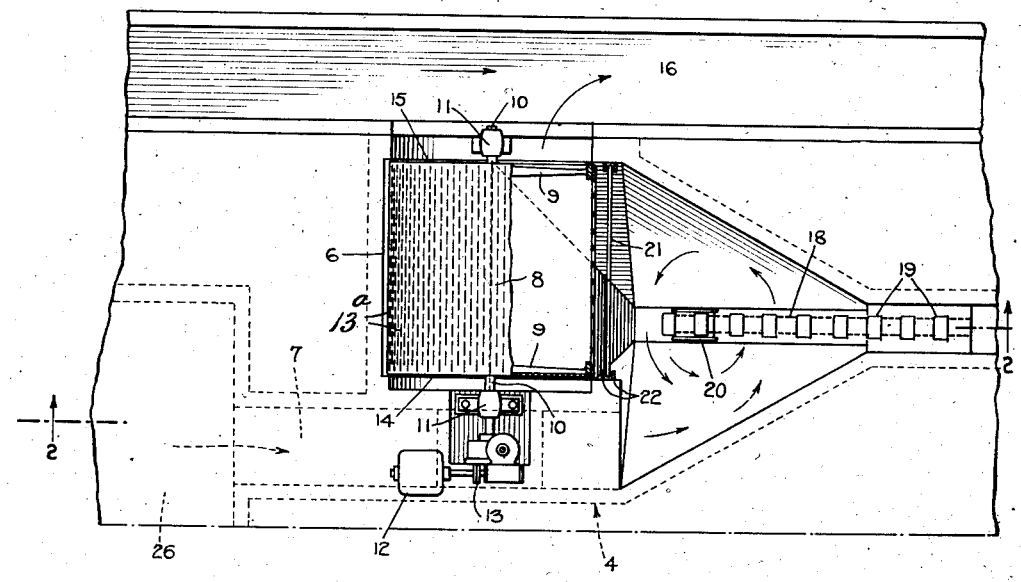

Oct. 20, 1931.  A. M. KIVARI  1,828,469
ROTARY DRUM SCREEN
Filed May 21, 1929

INVENTOR
Arthur M. Kivari
BY
ATTORNEY

Patented Oct. 20, 1931

1,828,469

UNITED STATES PATENT OFFICE

ARTHUR M. KIVARI, OF LOS ANGELES, CALIFORNIA, ASSIGNOR, BY MESNE ASSIGNMENTS, TO THE DORR COMPANY, INC., OF NEW YORK, N. Y., A CORPORATION OF DELAWARE

ROTARY DRUM SCREEN

Application filed May 21, 1929. Serial No. 364,892.

This invention relates to rotary drum screen apparatus of the type ordinarily used to remove solids from trade waste liquids or sewage and especially to the well known type of screen apparatus in which the screen is partially immersed or submerged in the waste liquid, the screened liquid flowing into the screen from the side and endwise therefrom and the screened or rejected solids collecting in a sedimentation basin or settling pit.

The waste liquid to be screened usually includes solids some of which are soft and adhesive and cling readily to the outside of the screen, thereby blinding it at frequent intervals unless some provision is made to remove them from the screen surface during the operation of the apparatus. Such removal or stripping of the solids from the screen surface may be effected in any suitable manner, as by rotating the screen at such a speed as to produce a suitable cascade action at the rising or ascending side of the screen. The rotation of the screen serves to lower the liquid level within the screen at the descending side thereof and to raise the liquid level at the ascending or rising side thereof, thereby creating at the ascending side of the screen a hydrostatic head of the liquid which, when a screen is rotated at a suitable speed, exerts sufficient pressure on the deposit of sludge or waste solids adhering to the outer surface of the ascending side of the screen to strip or discharge such deposit from the screen. This cascade action also tends to produce a current, flowing downwardly along the outer surface of the screen at its ascending side and assisting further in removing or stripping the waste material from the screen. Also in such forms of apparatus heretofore in use the screened or rejected solids have passed from the influent or descending side of the screen through a restricted passage beneath the screen to the sedimentation basin or screening pit.

In certain waste liquids or sewage there is a considerable amount of matter, such as grease, tending to float on the surface of the liquid in the sedimentation basin. Such floating matter, particularly the grease, has a strong tendency to adhere to the surface of the screen and to blind the same in course of time notwithstanding the provisions for cleaning by cascade action or by other known means.

An important object of this invention is to prevent floating material such as oil and grease from coming into contact with the screen. In carrying out this object of the invention the sewage or waste liquid is introduced into the sedimentation basin at the rising side of the screen so that the surface disturbance at that side, such as that produced by the cascading water tends to prevent the grease and floating solids from coming into contact with the screen.

With screens of this type it has heretofore been the practice to locate the screen in a sewage channel with the ends of the screen extending substantially to the sides of the channel and to provide a relatively restricted passage beneath the screen through which the solids rejected by the screen together with a substantial portion of the liquid would flow, this passage discharging into a sedimentation basin on the far side of the screen. With this arrangement floating material such as grease included in the sewage in the channel is brought directly into contact with the descending side of the screen. Furthermore, substantially all of the coarser solids which are rejected by the screen are forced into contact with the screen surface, and therefore under certain conditions may tend to diminish the screening capacity.

Another important object of the invention is to provide an arrangement including a screen of the type indicated, together with an influent channel and a settling basin, in which the sewage is first introduced into the settling basin which will serve to remove a substantial proportion of the coarser solids by sedimentation, so that such solids will never come into contact with the screen and the capacity of the latter will be thereby increased. This arrangement is adapted likewise to provide the quiesence necessary to permit sedimentation of the coarser solids, which is impractical in the restricted dimensions of a sewage channel.

In previous arrangements as above indicated the somewhat restricted passage beneath the screen may tend to produce a higher velocity at this point, which under certain conditions is not conducive to maximum screening efficiency. Another object of the present arrangement is to locate the screen with its submerged portions all in direct communication with the relatively quiescent sewage in the sedimentation compartment, so that a uniform upward flow directly toward and through all portions of the submerged area of the screen is obtained, without the flow along the surface of the screen commonly employed in previous arrangements. The screen is furthermore preferably located and arranged so that the solids rejected by the screen and tending to adhere to the screen surface are washed by the cascading action directly into the sedimentation pit at a point where the above described improved methods of operation will not be interfered with.

Another object of the invention is to provide for better removal of the floating material from the surface of the liquid in the sedimentation basin. In carrying out this feature of the invention the influent liquid is introduced at the surface of the sedimentation basin in a substantially tangential direction so as to cause a swirl on the surface of the sedimentation basin and direct the floating grease and other material to the path of foraminous buckets of a bucket elevator located at the opposite side of the sedimentation basin from the screen and serving to remove the collected solids from the bottom of the basin. In accomplishing this object the screen chamber preferably does not extend all of the way across the sedimentation basin at the end where it is located but is spaced from one side of the basin and this space is utilized for a horizontal influent channel whose horizontal bottom extends substantially to a position above a deep part of the basin from which the material is taken by the elevator. This arrangement assures a considerable drop in velocity of the liquid before it has an opportunity to pass down into the lower part of the pit; and in the specific embodiment of the invention shown in the drawings, directs the sewage into the basin substantially tangentially in a direction toward the end of the chamber opposite to that where the screen chamber is located. It will be apparent that this arrangement provides a very compact unit particularly as to floor space required, while retaining the advantages hereinbefore set forth.

Figure 2:
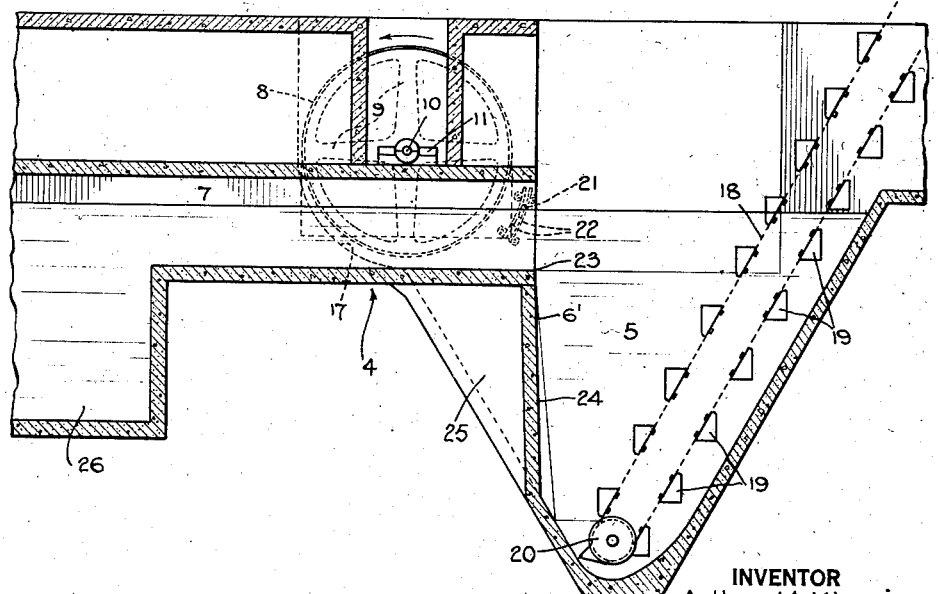

Other features and advantages of the invention will appear upon consideration of the following description and the accompanying drawings, in which Fig. 1 is a plan view of one embodiment of the invention; and Fig. 2 is a vertical section taken along the line 2—2 of Fig. 1.

When the sewage to be screened is supplied to the basin or pit 5 through the influent channel 7, there will be produced a surface current as indicated by the arrows on Fig. 1. During the passage of the sewage from the influent channel across the deep part of the pit, the larger and more rapidly settling solids will sink below said surface current and settle to the bottom of the pit for removal by the bucket conveyer 18; and, during the passage of the sewage through the path of the buckets 19, some of the floating solids will be picked up by the buckets. As a result of this action the sewage will be freed from a considerable amount of solids before it reaches the screen. It should be understood that, during operation of the apparatus, the screen is rotated in the direction of the arrow in Fig. 2 and at such a rate as to produce a cascade action at the inner or rising side of the screen capable of removing or stripping from the rising side of the screen the screened solids adhering thereto and carried up thereby. This cascade action serves in a well known manner to produce an outward and downward current at the cascade zone which tends to keep all scum material away from the screen.

Although the cascade action alone tends to sweep or drive the scum or surface material away from the screen, it may be found desirable to use a baffle 21, preferably automatically adjustable to correspond with variations in the height of the sewage in the apparatus. This result may be obtained by using a floating baffle 21, and guiding the same, as by curved guides 22 on opposite sides of the ends, to maintain substantially the same distance between the baffle and the screen, irrespective of the level of the liquid. The baffle assists in controlling the flow resulting from the cascade action, prevents the scum material from reaching the screen, and serves to cause the liquid flowing thereto from the elevator to be turned back toward the elevator for further action thereon.

Referring to the drawings, 4 designates a receptacle constructed of reinforced concrete or other suitable material and including a sedimentation basin or settling pit 5 to receive the screenings, a screen chamber 6 at one end of the basin of which it is in substance a part and extending from one side thereof only part way across the same, and a feed or influent channel 7 between the screen chamber and the other side of the basin to direct the influent material toward the opposite end of the basin and substantially tangential to and at the surface of the liquid in the basin. In the screen chamber there is a hollow cylindrical drum screen 8 of the internal flow type mounted by means of spiders 9 on a shaft 10 supported at its ends by bearings 11 and driven from a motor 12 or other suitable source of power through suitable power transmitting devices 13. The end 14 of the screen, adjacent to the influent channel, is closed and the bearing 11 at this end rests on the top wall of the influent channel. The other end 15 of the screen is open and communicates with an effluent channel 16. In use the screen is rotated so that the side toward the pit is the rising side as indicated by the arrow in Fig. 2. The screen chamber 6 is closed at the back and shaped to correspond with the shape of the lower part of the descending side of the screen and providing therebetween a shallow or restricted passage or opening 17 which may decrease in depth from the lower end thereof to the upper end thereof at the rear of the screen.

Preferably both the end walls and the side walls of the basin 5 are so shaped or inclined as to collect the screenings at a suitable position at the bottom of the pit 5 to enable their removal by suitable means such as an elevator or endless conveyor 18 of the chain type provided with foraminous draining or dewatering buckets 19. The conveyer is suitably supported, as by means including a sprocket 20 at the lower end thereof, and is driven by a suitable source of power not shown.

In order to produce the best results, the conformation and size of the settling pit are made such that the surface current caused by the entry of the sewage into the pit will not result in any substantial commotion or disturbance in the lower or settling zone of the pit. This result may be obtained to a considerable extent by making the pit of sufficient depth and area and also by arranging the influent channel with its bottom extending substantially horizontally to a line or edge 23 almost vertically above the deepest part of the basin or pit; the portion 24 of the rear end wall of the pit, beneath the edge 23, being substantially vertical; and the portion 25 of the side wall of the basin connected with the inner edge of portion 24, substantially vertical. Preferably there is provided a grit chamber 26 of the usual type beneath and communicating with the influent channel 7 to receive material which may be sufficiently heavy to settle in the same notwithstanding the velocity of the current in the influent channel.

It should be understood that other advantages than those enumerated may result from the application of this invention and that various changes may be made without departing from the spirit of the invention or the scope of the appended claims.

I claim:

1. In apparatus for screening sewage and the like, the combination with a drum screen receiving sewage from the side thereof and discharging screened effluent endwise therefrom, and rotatable to discharge screened solids by cascade action at the rising side thereof, of a sedimentation basin having at one end a screen chamber with a closed outer side adjacent to the descending side of the screen and also having a main portion into which the rising side of the screen projects, an elevator with foraminous buckets at the opposite end of the basin from the screen and means for supplying sewage across the main portion of said basin to permit settling of solids in the basin and to cause floating solids, between the rising side of the screen and said elevator, to move to said elevator.

2. In apparatus for screening sewage and the like, the combination with a drum screen receiving sewage from the side thereof and discharging screened effluent endwise therefrom, and rotatable to discharge screened solids by cascade action at the rising side thereof, of a sedimentation basin having at one end a screen chamber fitting closely to the screen at the descending side thereof leaving the rising side of the screen exposed to the liquid in the main portion of said basin, said screen and chamber extending from one side of said basin and partially across the same, a sewage supply channel extending past the end of the screen chamber at the other side of the basin and directed toward the other end of the basin, and a dewatering elevator at said other end of the basin to remove the accumulated solids from the bottom of the basin and also floating waste material brought into its path of action.

3. In apparatus for screening sewage and the like, the combination with a drum screen receiving sewage from the side thereof and discharging screened effluent endwise therefrom and rotatable to discharge screened solids by cascade action at the rising side thereof, of a sedimentation basin at one end of which said screen is located with its descending side adjacent to said end, a baffle separating said screen from the rest of the basin at the surface of the liquid therein and means for supplying sewage in a substantially horizontal direction into the upper part of the liquid in said basin to produce a swirl at the surface while leaving a relatively quiescent settling zone in the lower part of the basin.

4. In apparatus for screening sewage and the like, the combination with a drum screen receiving sewage from the side thereof and discharging screened effluent endwise therefrom and rotatable to discharge screened solids by cascade action at the rising side thereof, of a settling pit at the influent side of the screen and into which the rising side of the screen projects, and means for effecting a swirling motion at the surface of the liquid in said settling pit at the influent side of said screen to sweep away from the screen waste material floating at the surface.

5. In apparatus for screening sewage and the like, the combination with a drum screen receiving sewage from the side thereof and discharging screened solids by cascade action at the rising side thereof, of a settling pit at the influent side of the screen and into which the rising side of the screen projects, an elevator with foraminous buckets to remove screenings from said pit and means for creating a surface current to carry scum and floating material into the path of said buckets.

6. In apparatus for screening sewage and the like, the combination with a drum screen receiving sewage from the side thereof and discharging by cascade action screened solids adhering thereto at the rising side of a settling pit at the influent side of the screen and into which the rising side of the screen projects, an elevator with foraminous buckets to remove screenings from said pit, and means for introducing the sewage to said pit in a direction to produce a surface swirl in the liquid in said pit and sweep waste material into the path of said buckets.

7. In apparatus for screening sewage and the like, the combination with a drum screen receiving sewage from the side thereof and discharging screened effluent endwise thereof and rotatable to discharge screened solids by cascade action at the rising side thereof, of a settling pit at the influent side of the screen and into which the rising side of the screen projects, a dewatering elevator at the opposite end of the pit from the screen and means for introducing the unscreened liquid to said pit substantially tangentially at the screen end of the pit and directed toward said elevator.

8. In apparatus for screening sewage and the like, the combination with a drum screen receiving sewage from the side thereof and discharging screened solids by cascade action at the rising side thereof, of a settling pit at the influent side of the screen and into which the rising side of the screen projects, an elevator with foraminous buckets to remove screenings from said pit and means for creating a surface current to carry scum material into the path of said buckets and preventing downward movement of material in said current until it has reached a position substantially vertically above the deepest part of said basin.

9. In apparatus for screening sewage and the like, the combination with a drum screen receiving sewage from the side thereof and discharging screened solids by cascade action at the rising side thereof, of a settling pit at the influent side of the screen and into which the rising side of the screen projects, an elevator with foraminous buckets to remove screenings from said pit, and means for introducing the sewage to said pit horizontally and in a direction away from the screen to produce a surface swirl in the liquid in said pit to cause the liquid to flow around to said screen.

10. In apparatus for screening sewage and the like, the combination with a drum screen receiving sewage from the side thereof and discharging screened effluent endwise thereof and rotatable to discharge screened solids by cascade action at the rising side thereof, of a settling pit at the influent side of the screen and into which the rising side of the screen projects, a dewatering elevator at the opposite end of the pit from the screen, and means for introducing the unscreened liquid to said pit tangentially at the screen end of the pit and directed toward said elevator and for preventing downward movement of the liquid or solids therein until after they have reached a position substantially above the deep portion of said basin.

11. In apparatus for screening sewage and the like, the combination with a drum screen receiving sewage from the side thereof and discharging screened effluent endwise thereof and rotatable to discharge screened solids by cascade action at the rising side thereof, of a settling pit at the influent side of the screen into which the rising side of the screen projects and which is of greater width than the length of the screen, and an influent channel at one end of the screen to direct the sewage tangentially with reference to the liquid in the pit and toward the opposite end of the pit, the bottom of said channel extending substantially horizontally to a line substantially vertically above the lowest part of the pit and beyond the cascade zone.

In testimony whereof I affix my signature.

ARTHUR M. KIVARI.